(12) United States Patent
Benayoun et al.

(10) Patent No.: US 6,658,561 B1
(45) Date of Patent: Dec. 2, 2003

(54) HARDWARE DEVICE FOR EXECUTING PROGRAMMABLE INSTRUCTIONS BASED UPON MICRO-INSTRUCTIONS

(75) Inventors: Alain Benayoun, Cagnes-sur-Mer (FR); Jean-Francois Le Pennec, Nice (FR); Claude Pin, Nice (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/553,882

(22) Filed: Apr. 20, 2000

(30) Foreign Application Priority Data

May 31, 1999 (EP) ............................................. 99480042

(51) Int. Cl.[7] ................................................ G06F 9/28
(52) U.S. Cl. ...................................... 712/245; 712/300
(58) Field of Search ................................. 712/245, 248, 712/243, 235, 236, 211, 230, 32, 37, 300, 23, 24, 28

(56) References Cited

U.S. PATENT DOCUMENTS

| | | | | |
|---|---|---|---|---|
| 3,972,024 A | * | 7/1976 | Schroeder et al. | 712/243 |
| 4,155,120 A | * | 5/1979 | Keefer et al. | 712/235 |
| 5,210,833 A | * | 5/1993 | Kaneko | 712/236 |
| 5,537,560 A | * | 7/1996 | Boggs et al. | 712/245 |
| 5,625,786 A | * | 4/1997 | Takahashi | 712/230 |
| 6,049,672 A | * | 4/2000 | Shiell et al. | 717/168 |
| 6,105,125 A | * | 8/2000 | Nemirovsky et al. | 712/209 |

FOREIGN PATENT DOCUMENTS

EP   0 556 825 A1 * 8/1993

* cited by examiner

Primary Examiner—Henry W. H. Tsai
(74) Attorney, Agent, or Firm—Scully, Scott, Murphy & Presser; Louis J. Percello, Esq.

(57) ABSTRACT

The present invention is directed to a hardware device for parallel processing a determined instruction of a set of programmable instructions having a same format with an operand field defining the execution steps of the instruction corresponding to the execution of micro-instructions, comprising decision blocks (12—20) being each associated with a specific instruction of the set of programmable instructions, only one decision block being selected by the determined instruction in order to define which are the specific micro-instructions to be processed for executing the determined instruction, activation blocks (22–30) respectively associated with the decision blocks for running one or several specific micro-instructions, only the activation block associated with said selected decision block being activated to run the specific micro-instructions, and a micro-instruction selection block (46) connected to each activation block for selecting the specific micro-instructions to be executed.

11 Claims, 4 Drawing Sheets

HARDWARE DEVICE FOR EXECUTING PROGRAMMABLE INSTRUCTIONS BASED UPON MICRO-INSTRUCTIONS

BACKGROUND OF THE INVENTION

1. Technical Field

The present invention relates generally to the execution of instructions based upon the processing of one or several micro-instructions in a data processing system, and relates in particular to a hardware device for executing programmable instructions by using a set of determined micro-instructions.

2. Prior Act

At the beginning of computers, these ones had small amounts of memory. Therefore, in order to maximize the performance of the computers in the 1960's, a complex instruction set (well known as CISC) was used to reduce the amount of memory needed. The net effect was an increased efficiency since as a program took less of computer memory, it could retrieve more information for processing.

At that time, memory sub-systems were far slower than the CPU. If one complex instruction encapsulated several simple instructions, the time spent retrieving the instruction from memory was reduced. This was very important insofar as computers were very sequential; the instruction had to be completed before the computer retrieved another instruction from memory processing.

Another key to CISC was microcode. Microcode essentially acted as a translation layer between the instructions and the electronics of the computer. Microcode was a blessing for computer-architects because it made it easier to add new types of machine instructions without having to design new electronic circuits. They could design an architecture family, that is a range of computers sharing the same instruction set.

The net result of microprogramming, apart from the above, was it reduced traffic between the CPU and the memory. It lessened the volume of instructions in the data path making way for more data to move across the path.

But the disadvantage of the CISC data processing systems was that both programmers and compilers used complex instructions only by a quite small percentage. Ever one of these complex instructions only however needs a much greater number of transistors in the chip than the simple instruction, thereby increasing the size of the silicon chip.

In the end of 1970's, advances in semiconductor technology began to reduce the difference in speed between main memory and processor chips. As memory speed increased and high-level languages displaced assembly language, the major advantages of CISC began to disappear, and computer designers started to study ways computer performance could be optimized beyond just making faster hardware.

One of their key realizations was that a sequence of simple instructions produces the same results as a sequence of complex instructions, but can be implemented with a simpler (and faster) hardware design. Reduced Instruction Set Computing (RISC) was the result. In a RISC machine, the instruction set contains only simple, basic instructions, from which more complex instructions can be composed. Each instruction has the same length, so that it may be fetched in a single operation. Most instructions complete in one machine cycle, which allows the processor to handle several instructions at the same time. This pipelining is a key technique used to speed up RISC machines.

As a result, the RISC compilers have to generate software routines to perform complex instructions that would have been done in hardware by CISC computers. Since RISC does not have a full set of instructions as in CISC, this requires longer codes to be written and a less optimized sequencing of instructions compared to the optimized CISC instructions. In other words, RISC is not always adapted to all programs, especially when a reduced number of complex instructions is the most frequently used sequence of instructions.

SUMMARY OF THE INVENTION

Accordingly, the main object of the invention is to provide a hardware device for processing a set of instructions that better matches the need of each program, allowing the use of simple instructions where necessary and more complex instructions fitting the most frequently used sequence of basic instructions.

Another object of the invention is to provide a hardware device for processing programmable instructions able to run selected sequences of micro-instructions among a limited set of micro-instructions.

The invention relates therefore to a hardware device for parallel processing a determined instruction of a set of programmable instructions having a same format with an operand field defining the execution steps of the instruction, each of the execution steps corresponding to a micro-instruction selected among a plurality of micro-instructions. This device comprises decision blocks being each associated with a specific instruction of the set of programmable instructions, only one decision block being selected by the determined instructions in order to define which are the micro-instructions to be processed for executing the determined instruction, activation blocks respectively associated with the decision macroblocks for running one or several specific micro-instructions, only the activation block associated with the selected decision block being activated to run the specific micro-instructions, and a micro-instruction selection block connected to each activation block for selecting the specific micro-instructions among the plurality of micro-instructions in response to the contents of the operand field of the determined instruction.

BRIEF DESCRIPTION OF THE DRAWING

Preferred embodiments of the present invention will now be described, by way of example only, with reference to the accompanying drawings in which.

DETAILED DESCRIPTION OF THE PREFERRED EMBODIMENTS OF THE INVENTION

The main idea of the present invention is to select, among a set of instructions, a group of appropriate instructions to be used as programmable instructions for the programs assembling the most frequently used instructions and sequences of instructions. Such a selection can be made on a specific range of instructions reserved for this purpose and/or may be a replacement of the unused or less used by more appropriate instructions. Each of the programmable instructions is a sequence of micro-instructions taken in a reduced set of micro-instructions.

It is assumed that each construction considered in the present invention includes an operand field (opcode) of 8 bits. This means that the set of instructions comprises 256 instructions. Among these instructions, it is preferable that only a part of them be programmable whereas other ones are not. Thus, as an example, it can be assumed that the instructions having an operand field the value of which is between 00000000 and 11011111 are predefined whereas the instructions having an operand field the value of which is between 11100000 and 11111111 are programmable.

Figure 1:
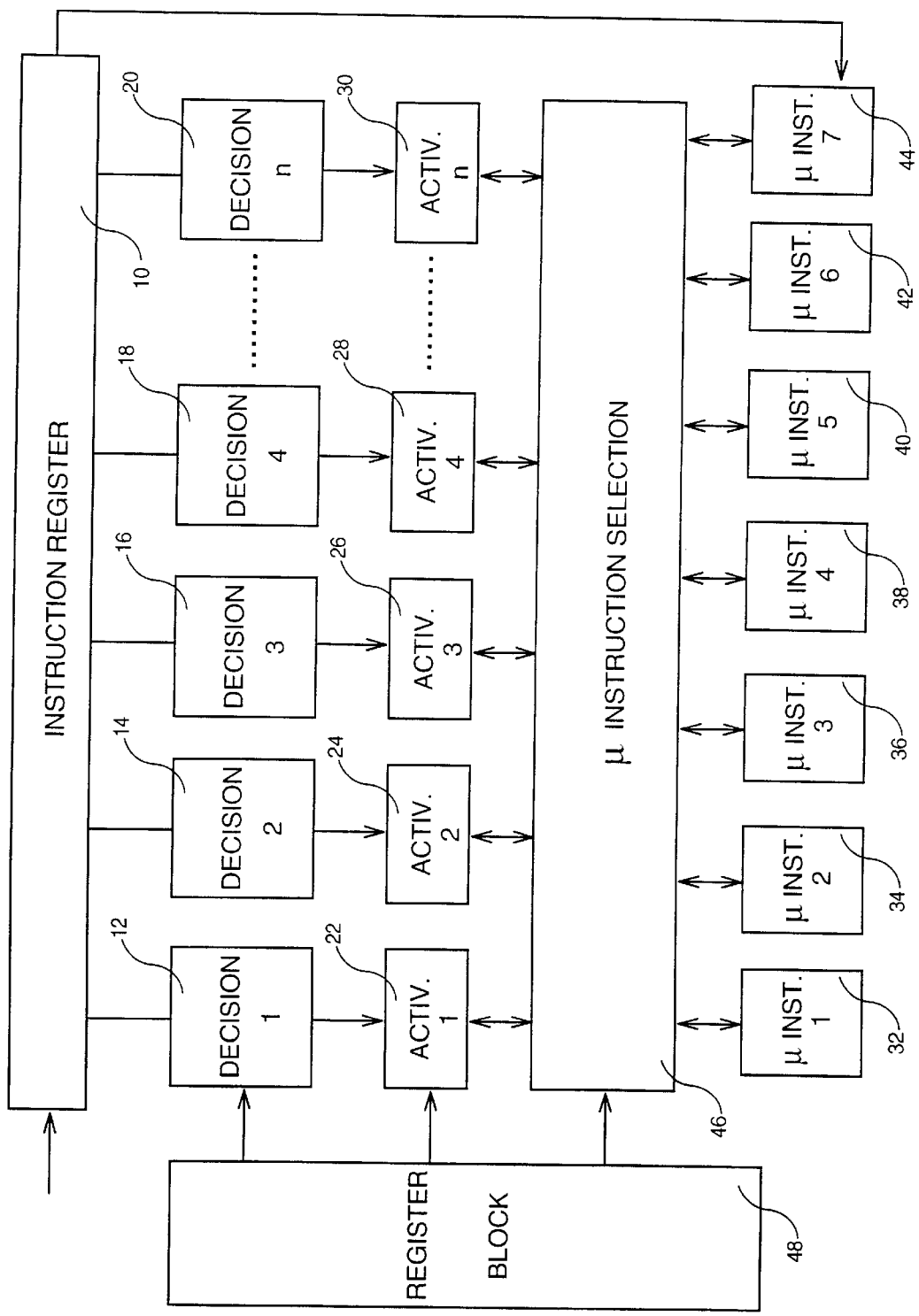
FIG. 1 is a block-diagram representing a preferred embodiment of the device according to the invention.

In the hardware device according to the invention illustrated in FIG. 1, an instruction register 10 is used to load the instruction to be executed. Each instruction among a group of n instructions is decoded by one decision block 12, 14, 16, 18 or 20 among n decision blocks respectively associated with the n instructions. The output of each decision block 12–20 is supplied to one corresponding activation block in a plurality of n activation blocks 22, 24, 26, 28, 30. The outputs of activation blocks 22–30 are all at 0 except the output of the activation block corresponding to the decision block associated with the instruction loaded in register 10 which is at 1.

Then, the activation block receiving 1 from its corresponding decision block activates one or several of micro-instructions 32, 34, 36, 38, 40, 42, 44 which have to be run in the execution of the decoded instruction. As an example, the number of micro-instructions is 7 in FIG. 1. In a general way, the number of micro-instructions is reduced for example 64 or less insofar as such a reduced number defines a very important number of combinations determined by the operand field to the instruction.

As seen hereafter, a micro-instruction selection block 46 is used to select the specific micro-instructions which have to be run in answer to the contents of the operand field. Also, a register block 48 is used to store the control bits defined by the operand field of the instruction and enabling both the selected activation block and the micro-instruction selection block 46 to be controlled according to the programmable instruction as described hereafter.

Figure 2:
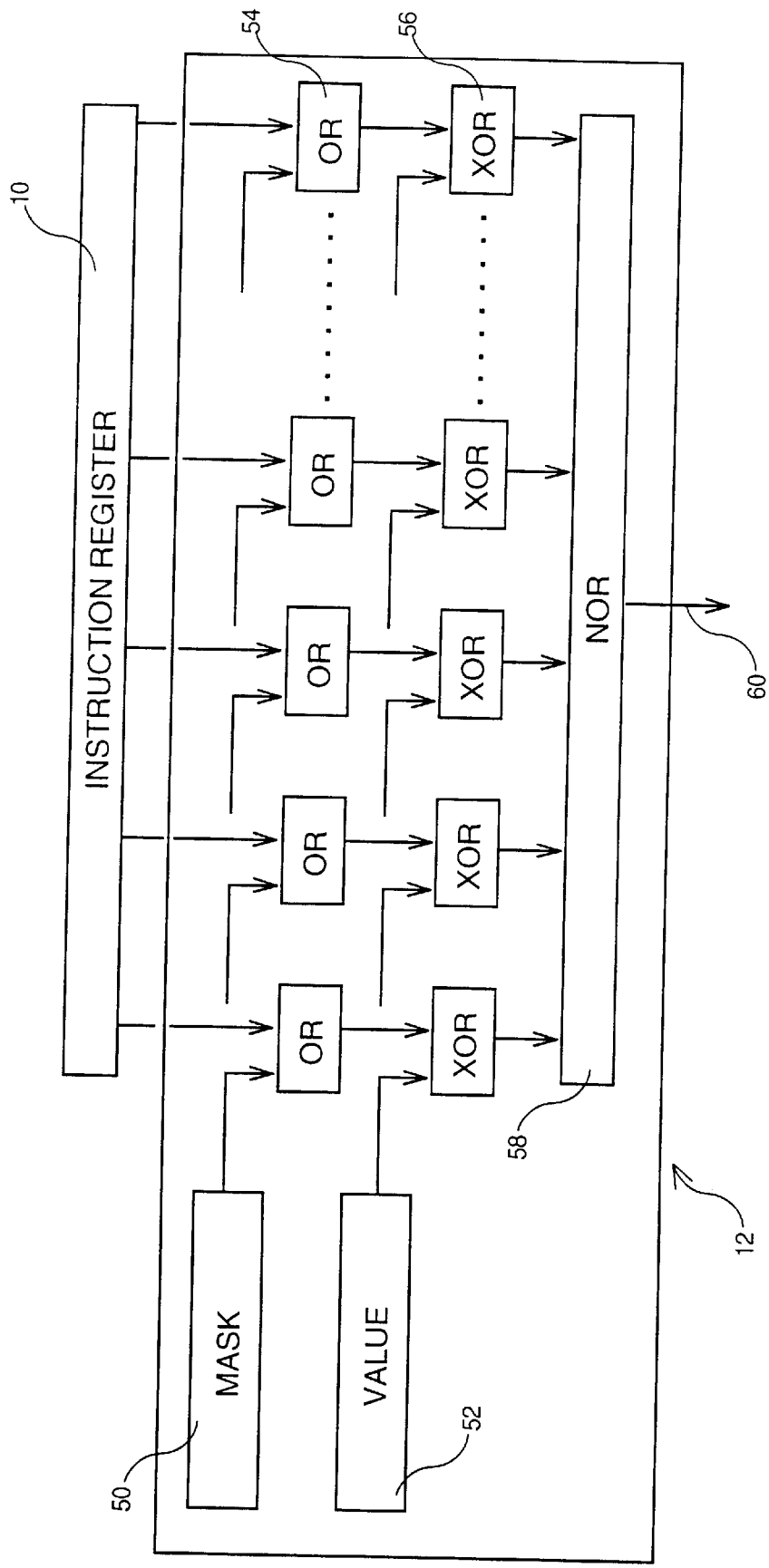
FIG. 2 is a block-diagram representing a preferred embodiment of a decision block of the device according to the invention.

Each decision block 12, 14, 16, 18, or 20 is a hardware device which is configured according to the associated instruction as described now in reference to FIG. 2. Such a configuration is made by using a mask register 50 and a value register 52. Mask register 50 which has the same length as instruction register 10, contains bits used to mask the bits which are irrelevant for the execution of the invention. These bits are all data bits which are not operand bits in the instruction, but can also be bits of the operand field which are useless for this instruction. Thus, the instructions for a 8 bits compare and 16 bits compare are similar but 8 bits of the operation code are useless for a 8 bits compare and can be masked. In such a case, the mask enables the number of decision blocks to be reduced since several instructions are presented by a single mask. Note that in the preferred embodiment, the bits which are used as a mask are set to 1 and the other bits corresponding to relevant bits of the operand field are set to 0. Each bit of the mask register is logically combined in an OR circuit 54 (only one circuit is referenced in FIG. 2) with the corresponding bit of the instruction loaded in instruction register 10. This means that only useful bits of the operand field of the instruction keep their right value whereas the other bits corresponding to the masking bits of mask register 50 are all set to 1. Value register 52 which has the same length as instruction register 10, contains bits identical to the useful bits of the operand field in the instruction and useless bits of the operand field or bits of other data fields are set to 1. Each bit of value register 52 is logically combined in a XOR circuit 56 (only one circuit is referenced in FIG. 2) with the corresponding bit delivered by the OR circuit associated with the corresponding bit of the instruction. Then, all the bits delivered by the XOR circuit are logically combined in a NOR circuit 58. This means that the output line 60 of the NOR circuit is set to 1 only if all the outputs of the XOR circuits are 0, that is when the sequence of bits at the outputs of the OR circuits is identical to the sequence of bits loaded in value register 52. In other words, the output line 60 of the decision block is 1 only if this block is configured according to the instruction loaded in instruction register 10.

Though the determination of the involved instruction is preferable implemented by using decision block as described in reference to FIG. 2, it is possible to use any other decode mechanism. Thus, a basic decoding of the opcode of the instruction would be sufficient to identify and select the micro-instructions to be run.

As an example if a range is defined for the set of programmable instruction, a first decode will identify this range. It corresponds to a Chip Select (CS) lead well know in computer and logic design. In addition a separate decode of the significant bits within this range is made to select each instruction. This can be done using classical 3 to 8 or 4 to 16 decoders. A equivalent design using logical AND, OR and inversor gates may be used. Then, each decision block is an AND between each output of this decoder and the CS lead decoding the range. There will be, if there is a programmable instruction opcode, only one decision block which will identify and select this opcode as there will be only one decoder output valid. If the opcode being decoded is not within the programmable range, CS will not rise and no selector block will be activated.

Always with the example already mentioned above, it is assumed that 5 bits of the OPCODE are programmable, resulting in a subset of 32 programable instructions. This subset can be divided into 8 groups of instructions defined by 3 bits and each group can include 4 instructions defined by 2 bits. In such an example, a group determines the micro-instructions which can be activated by the instructions of the group, and an instruction determines which of these micro-instructions are executed and in which order (in parallel or in sequence).

Assuming that the micro-instructions which can be used in a group are taken from a global set of 64 micro-instructions, the preferred method is to pre-define associations of micro-instructions. With a selection code of 8 bits, it is possible to define 256 of such associations of micro-instructions. Note that the number of these associations can be more important thereby increasing the number of bits of the selection code.

Assuming that an association of 3 micro-instructions be assigned to a group, it is necessary to define an execution code determining for each instruction of the group the micro-instructions among these 3 micro-instructions to be used and in which order. In such a case, the following capabilities of execution are as follows:

1: Micro-instructions 1, 2 and 3 executed in parallel
2: Micro-instructions 1, 2 executed in parallel, not executed
3: Micro-instructions 1, 3 executed in parallel, 2 not executed
4: Micro-instructions 2, 3 executed in parallel, 1 not executed
5: Micro-instructions 1 executed, 2 and 3 not executed
6: Micro-instructions 2 executed, 1 and 3 not executed
7: Micro-instructions 3 executed, 1 and 2 not executed
8: Micro-instructions 1, 2 and 3 executed in sequence
9: Micro-instructions 2, 1 and 3 executed in sequence
10: Micro-instructions 2, 3 and 1 executed in sequence
11: Micro-instructions 3, 2 and 1 executed in sequence
12: Micro-instructions 3, 1 and 2 executed in sequence
13: Micro-instructions 1, 3 and 2 executed in sequence
14: Micro-instructions 1, 2 executed in sequence, 3 not executed
15: Micro-instructions 1, 3 executed in sequence, 2 not executed
16: Micro-instructions 2, 3 executed in sequence, 1 not executed
17: Micro-instructions 2, 1 executed in sequence, 3 not executed
18: Micro-instructions 3, 1 executed in sequence, 2 not executed
19: Micro-instructions 3, 2 executed in sequence, 1 not executed
20: Micro-instructions 1, 2 executed in parallel, 3 after
21: Micro-instructions 1, 3 executed in parallel, 2 after
22: Micro-instructions 2, 3 executed in parallel, 1 after
23: Micro-instructions 3 first then 1, 2 executed in parallel
24: Micro-instructions 2 first then 1, 3 executed in parallel
25: Micro-instructions 1 first then 2, 3 executed in parallel Accordingly, an execution code of 5 bits for each instruction of the group is sufficient. Of course, when more micro-instructions are used in a group, the execution code can require more than 5 bits.

Figure 3:
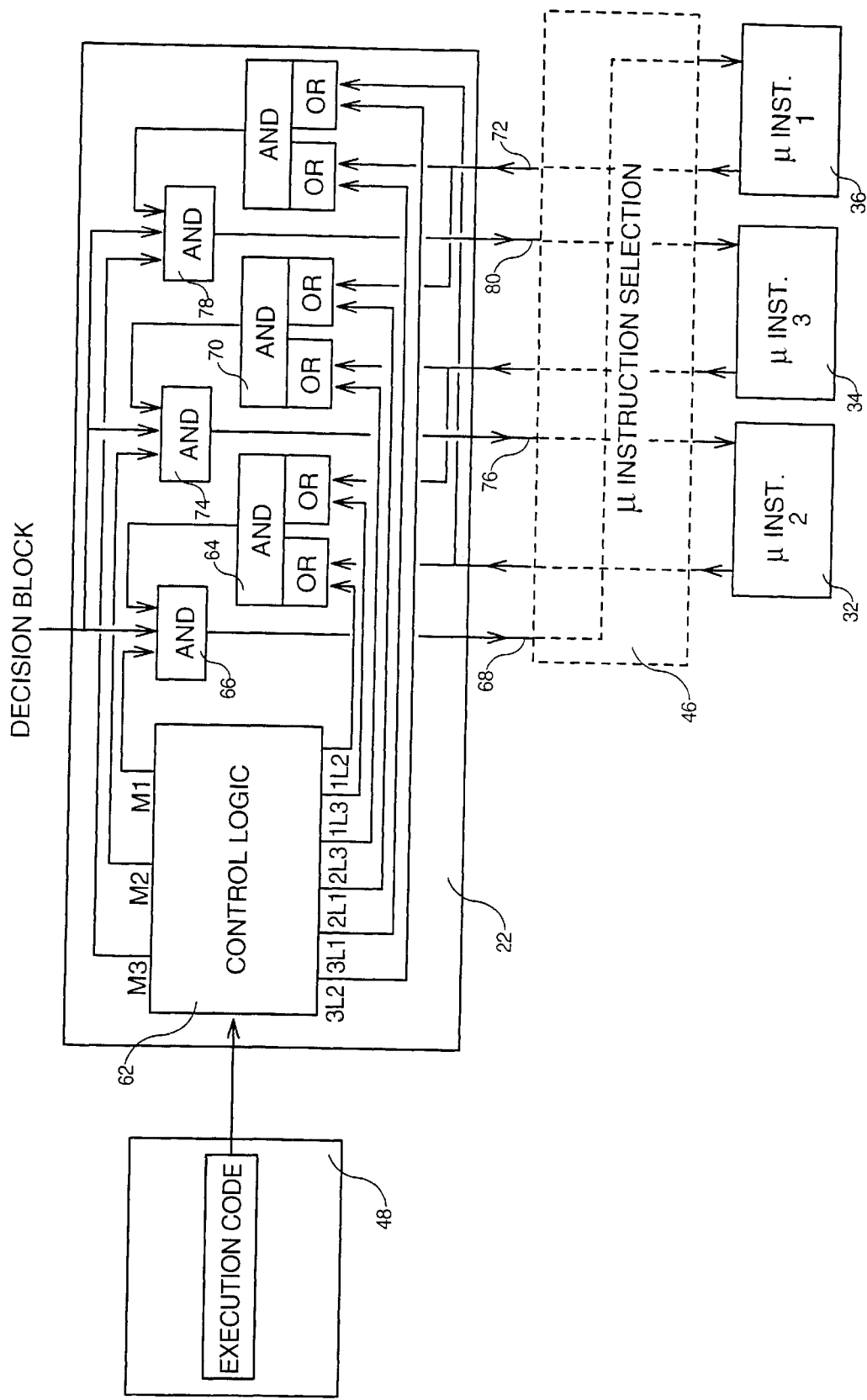
FIG. 3 is a block diagram representing principally a preferred embodiment of an activation block of the device according to the invention.

A preferred embodiment of an activation block 22–30 (e.g. activation block 22) activating 3 micro-instructions among the set micro-instructions is now described in reference to FIG. 3.

It must be noted that in the present example, each group requires 8 bits (selection code) and 4×5 bits (execution code), that is 28 bits. Therefore, since there are 8 groups defined by 3 bits of the operand field of the instruction, the register block must have a minimum capacity of 28×8=224 bits. But it is clear that the capacity of the register block must be adapted to the number of micro-instructions being used, the number of associations of micro-instructions, the number of programmable instructions and the number of groups of programmable instructions.

It must be noted that, further to define the programmable instructions by a sub-field in the opcode of the instruction, some programmable instructions can be defined by a replacement of the unused or less used instructions. Such a replacement by programmable instructions is achieved by modifying the contents of mask register 50 and value register 52 in the decision block (see FIG. 2) in response to a specific code in register block 48.

Returning to FIG. 3, the execution code (of 5 bits) from register block 48 is used by a control logic 62 in the activation block to set the outputs M1, M2, M3 and 1L2, 1L3, 2L3, 2L1, 3L1, 3L2. M1, M2, M3 outputs define which micro-instructions are to be activated, M1 corresponding to micro-instruction 1 (32), M2 corresponding to micro-instruction 2 (34) and M3 corresponding to micro-instruction 3 (36). The bottom outputs mLn determine in which order these micro-instructions are activated. For information, mLn with m and n being 1, 2 or 3, indicates that micro-instruction m will be executed only after micro-instruction n has been completed.

In order to simplify the figure, micro-instruction selection block 46 which will be described hereafter, is only represented by dotted lines. Likewise, the connection lines between activation block 22 and the micro-instructions are represented by dotted lines without the details of the connections.

Though in the example, only three micro-instructions are executed, it is possible that the number of micro-instructions to be executed be different. In a general way, if the number of instructions is I, the outputs of control logic 62 are M1, M2, M1, and the number of bottom outputs mLn is equal to 1×(I−1). Note that each one of the M output is a mask for the corresponding micro-instruction: 1 selects the micro-instruction and 0 disables it.

Based upon the above implementation of control logic 62, it is clear to understand how to implement a combination of logic circuits AND and OR represented in FIG. 3. But, it is also clear that such circuits could be replaced by the skilled man by a different hardware logic to achieve the same result.

It must be noted that, each micro-instruction block 32, 34 or 36 has an input line which is used to activate the micro-instruction when set to 1 and an output line set to 1 only when the execution of the micro-instruction has been completed.

Assuming that only micro-instructions 1 and 2 are to be run, with micro-instruction 2 being executed after the completion of micro-instruction 1, the binary values of the control logic outputs are set as follows:

M1→1
M2→1
M3→0
1L2→1
1L3→1
2L3→1
2L1→0
3L1→1
3L2→1

Referring again to FIG. 3, both 1L3 and 1L2 being set to 1, AND circuit 64 has its two inputs (OR circuits) set to 1 and AND 64 provides an output 1 to AND circuit 66. Since activation block 22 of FIG. 3 is selected, the input from decision block 12 (see FIG. 2) is set to 1. The third input Ml of AND circuit 66 being also 1, AND circuit 66 provides a bit 1 on its output line 68 which activates micro-instruction 1.

Conversely, AND circuit 70 has its first input set to 1 (by 2L3). But its second input is 0 since among its two inputs, 2L1 is set to 0 and micro-instruction 1 provides a bit 0 on its output line 72 as long as micro-instruction 1 has not been completed. As soon as micro-instruction 1 has been completed, it provides a bit 1 on output line 72 and AND circuit 70 has its two inputs which are set to 1. Therefore, AND circuit 70 sets its output to 1. The three inputs of AND circuit 74 being set to 1 since M2 output is 1, it provides a bit 1 on its output line 76 which activates micro-instruction 2.

As far as micro-instruction 3 is concerned, it will never be activated. As a matter of fact, AND circuit 78 has its input M3 which is set to 0 by control logic 62. Therefore, the output line 80 (activation line of micro-instruction 3) of AND circuit 78 is always 0.

Figure 4:
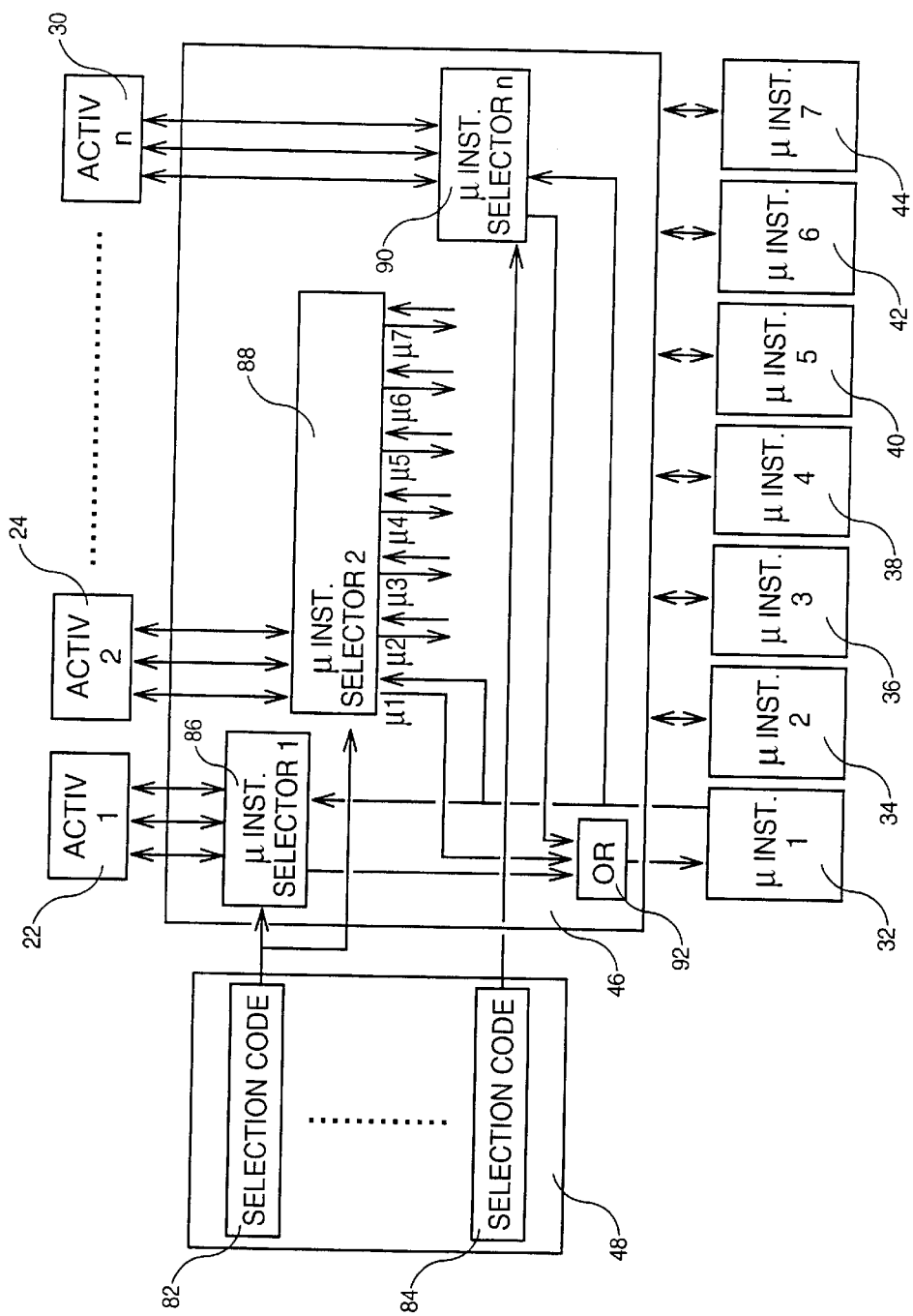
FIG. 4 is a block-diagram representing principally a preferred embodiment of the micro-instruction selection block of the device according to the invention.

Micro-instruction selection block 46 (see FIG. 1) connected to each one of the activation blocks for selecting the specific micro-instruction to be used by the instruction among the plurality of micro-instructions is now described in reference to FIG. 4.

As mentioned above, register block 48 is used to store the control bits defined by the operand field of the instruction, and in particular, a selection code associated with each group of instructions for defining which are the micro-instruction to be used in the instruction. Assuming that there are 256 associations of micro-instructions, each selection code includes 8 bits. If, as defined above, there are 8 groups of instructions (defined by 3 bits in the opcode), 8 selections codes 82 or 84 are necessary to control micro-instruction selection block 46.

Micro-instruction selection block 46 is composed essentially of n selectors 86, 88, 90 respectively associated with each one of the activation blocks. As illustrated in FIG. 4, selector 86 is associated with activation block 22, selector 88 is associated with activation block 24 and selector 90 is associated with activation block 30.

Each micro-instruction selector 86, 88 or 90 includes as many logical combinatory circuits as the number of outputs multiplied by the number of inputs. For each couple input/output, this circuit uses the selection code and connections from the associated activation blocks as inputs and has a single output to the appropriate micro-instruction via OR circuit 92. The combinatory circuit sets its output to 1 each time the input from the selection code is activated, that is for all selection codes which have defined to map this input to this output. For all other values of the selection code, the output is set to 0. For example, with a selection code of 8 bits defining 256 possible cases, only 10 cases could have defined micro-instruction 4 (38) to be associated with output 1 of activation block 2 (24)

Assuming that there are 8 groups of 4 instructions, this means that n=32 and there are 32 activation blocks respectively associated with 32 selectors. Besides, a selector code controls 4 selectors, such as selector code 82 which controls selector 86 (1), selector 88 (2).

In the example illustrated in FIG. 4, 3 micro-instructions among 7 micro-instructions are activated, thereby requiring three bidirectional connection lines between an activation block and it associated selector in micro-instruction selection block 46. The output line of each selector is not connected directly to the selected micro-instruction via an OR circuit since each selector can activate each micro-instruction depending upon the selection code in register block 48. Accordingly, all the outputs of selectors 1 to n are combined in an OR circuit such as OR circuit 92 for each micro-instruction. In the other direction, that is from each micro-instruction block to the selector, there is no need to aggregate the connection lines since the line from the micro-instruction block will be set to 1 and recognized directly by the selector defined by the selector code and not by the other selectors since only one selector is active. Therefore, the output of each micro-instruction is connected directly to all the selectors and reciprocally, each selector is connected to each micro-instruction block by two connection lines, an output line (by the intermediary of an OR circuit) and an input line (directly).

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A hardware device for parallel processing a determined instruction of a set of programmable instructions having a same format with an operand field defining the execution steps of the instruction, each of said execution steps corresponding to a micro-instruction select among a plurality of micro-instructions; said device comprising:

decision blocks being each associated with a specific instruction of said set of programmable instructions, only one decision block being selected by said determined instruction in order to define which are the micro-instructions to be processed for executing said determined instruction;

activation blocks respectively associated with said decision blocks for running one or several specific micro-instructions, only the activation block associated with said selected decision block being activated to run said specific micro-instructions; and a micro-instruction selection block connected to each one of said activation blocks for selecting said specific micro-instructions among said plurality of micro-instructions in answer to the contents of said operand field of said determined instruction.

2. The device according to claim 1, further comprising a register block for storing a selection code selecting said specific micro-instructions and an execution code defining which ones of said specific micro-instructions and in which order they have to be run.

3. The device according to claim 2, wherein each one of said activation blocks includes a control logic responsive to said execution code in said register block, said activation block associated with said selected decision block being activated providing, in response to said execution code and to said decision block, first control signals (M1, M2, M3) for selecting which micro-instructions among said specific micro-instructions are to be run and second control signals (3L2, 3L1, 2L1, 2L3, 1L3, 1L2) determining each micro-instruction to be run and which previous micro-instruction has to be completed before.

4. The device according to claim 3, wherein said activation block further comprises a combinatory logic including an AND circuit associated with each one of said specific micro-instructions and logic circuits, the output of said AND circuit being set to 1 for activating the associated micro-instruction when said decision block associated with said activation block is activated, said control signal for selecting the micro-instruction is active and said previous micro-instruction has been completed.

5. The device according to claim 2, wherein said micro-instruction selection block comprises a plurality of micro-instruction selectors respectively associated to each one of said activation blocks, each micro-instruction selector connecting the associated activation block to said specific micro-instructions in response to said selection code.

6. The device according to claim 5, wherein each said micro-instruction selector includes connecting means for connecting said associated activation block to each micro-instruction, only the connections to said specific micro-instructions being activated in response to said selection code.

7. The device according to claim 6, wherein said connecting means in said micro-instruction selector includes means for activating each micro-instruction which has been selected in response to said selection code and means for connecting said selected micro instruction to said associated activation block when said selected micro-instruction has been completed.

8. The device according to claim 2, wherein said set of programmable instructions is a first set of instructions among a plurality of instructions comprising also a second set of non programmable instructions, said set of programmable instructions being defined by a sub-field of said operand field.

9. The device according to claim 8, wherein said sub-field of said operand field includes a first part defining groups of instructions respectively associated with groups of specific micro-instructions among said plurality of micro-instructions, each group of instructions being respectively associated with one selection code stored in said register block, and a second part defining said determined instruction among said group of instructions, said determined instruction being respectively associated with one execution code in said register block to define which micro-instructions among the group of specific micro-instructions selected by said selection code are to be activated and which order.

10. The device according to claim 1, wherein each of said decision blocks comprises a mask register having the same length of said determined instruction and containing a mask for masking the bits of the fields other than the operand field and a value register containing a value having the same length of said determined instruction and composed of a defined part corresponding and being identical to said operand field, and combinatory logic means for logically combining said determined instruction with the contents of said mask register and the contents of said value register so that the output of said decision block is 1 only when said determined instruction is said specific instruction associated with said decision block.

11. The device according to claim 10, wherein some programmable instructions can be defined by a replacement of the unused or less used instructions, said replacement being achieved by modifying the contents of said mask register and said value register in said decision block in response to a specific code in said register block.

* * * * *